United States Patent [19]

Berke et al.

[11] Patent Number: 5,626,663

[45] Date of Patent: *May 6, 1997

[54] COMPOSITION AND METHOD FOR INHIBITING DRYING SHRINKAGE OF CONCRETE

[75] Inventors: Neal S. Berke, Chelmsford, Mass.; Michael P. Dallaire, Dover, N.H.; Awdhoot V. Kerkar, Columbia, Md.

[73] Assignee: W. R. Grace & Co.-Conn., New York, N.Y.

[ * ] Notice: The term of this patent shall not extend beyond the expiration date of Pat. No. 5,622,558.

[21] Appl. No.: 518,628

[22] Filed: Aug. 23, 1995

Related U.S. Application Data

[63] Continuation-in-part of Ser. No. 295,975, Aug. 25, 1994, abandoned.

[51] Int. Cl.$^6$ .................................................. C04B 24/00
[52] U.S. Cl. ........................ 106/696; 106/695; 106/724; 106/725; 106/802; 106/809; 106/823
[58] Field of Search .................. 106/695, 696, 106/724, 725, 802, 809, 823, 819; 264/299, 333

[56] References Cited

U.S. PATENT DOCUMENTS

| | | | |
|---|---|---|---|
| 4,027,059 | 5/1977 | Koons | 106/279 |
| 4,792,360 | 12/1988 | Pierce et al. | 106/823 |
| 5,020,598 | 6/1991 | Cowan et al. | 106/802 |
| 5,181,961 | 1/1993 | Umaki et al. | 106/823 |
| 5,356,671 | 10/1994 | Drs | 106/802 |
| 5,389,143 | 2/1995 | Abdelrazig et al. | 106/823 |

*Primary Examiner*—Mark L. Bell
*Assistant Examiner*—Michael Marcheschi
*Attorney, Agent, or Firm*—Howard J. Troffkin

[57] ABSTRACT

A concrete composition capable of inhibiting shrinkage of structural concrete structures is disclosed. The concrete is formed with an admixture composed of at least one secondary/tertiary alkanediol.

19 Claims, No Drawings

COMPOSITION AND METHOD FOR INHIBITING DRYING SHRINKAGE OF CONCRETE

This application is a continuation-in-part of our application U.S. Ser. No. 08/295,975 filed Aug. 25, 1994 for "Shrinkage Reduction Cement Composition", now abandoned.

BACKGROUND OF THE INVENTION

The present invention is directed to a method of inhibiting drying shrinkage of and cracking with respect to structural concrete formations and to compositions capable of providing said inhibition without imparting significant set retardation to the treated concrete.

One of the major disadvantages of conventional concrete compositions is that they tend to shrink during drying of the composition. This shrinkage results in cracks and other defects in the resultant structure. The cracks cause both appearance and physical defects to the structure. Although the magnitude of the shrinkage is normally small, it is of extreme importance. Such shrinkages give rise to internal and external stresses which cause formation of cracks. The largest changes normally take place during the early life of the structure.

The resultant cracks provide means of seepage of water in and through the structure. Water entry further deteriorates the structure through freeze-thaw pressures exerted by the water on the cement composition and by corrosion of metal reinforcing elements within the structure.

Various attempts have been made without success to vary cement-based compositions, per se, to overcome the shrinkage problem. These attempts included varying the properties of the cement, varying the methods of manufacture of a concrete mix and varying the ballast material used to form the resultant concrete composition. None of these attempts have resulted in a satisfactory solution.

Various admixtures have been proposed as useful in reducing shrinkage and the resultant cracking. For example Japanese Laid-Open Applications 81/37259 and 87/10947 disclose the use of alcohol-alkylene oxide and alkylphenol-alkylene oxide adducts as useful for this purpose. It was found that these materials must be used in large dosages which cause their usage to be expensive in order to provide the desired result. Lower alcohols as $C_4$–$C_6$ alkyl alcohols (See U.S. Pat. No. 5,181,961) have also been suggested but these materials tend to be readily leached out by wet conditions which may be encountered. Further, such lower alcohols have high vapor pressures at ambient conditions and, therefore, are difficult to handle.

Further, various primary polyols have been suggested as a crack control agent. For example, Japanese Laid-Open Application 55-027819 discloses primary diol compounds of the formula $RC(CH_2OH)_2CH_3$, such as neopentylglycol, as being useful to inhibit shrinkage; EPA 308,950 discloses terminal hydroxyl containing compounds of the formula $C_nH_{2n}(OH)_2$ with the value of n being 5–10 as suitable for reduction of shrinkage; Japanese Laid-Open Application 06-072749 discloses 1,6 hexanediols for the desired purpose; and Japanese Laid Open Application 06-072748 disclose 2,2,-dimethyl-1,3-propanediol (neopentylglycol) for the desired purpose.

It is highly desired to provide a method and an admixture for use therein which is capable of reducing shrinkage and resultant cracking of the cast concrete composition structure to high degrees.

SUMMARY OF THE INVENTION

The present invention is directed to a method of inhibiting drying shrinkage in concrete structural formations which requires the addition of a cement admixture composed of at least one secondary/tertiary hydroxyl group containing compound represented by the Formula I:

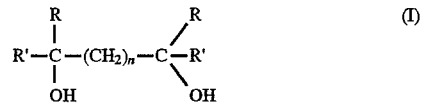

wherein each R independently represents hydrogen or $C_1$–$C_2$ alkyl; each R' independently represents a $C_1$–$C_2$ alkyl and n is an integer of 1–2.

The inclusion of from about 0.8 to 4 weight percent of the subject compounds based on the cement content of the treated composition unexpectedly provides an enhanced degree of reduction of shrinkage and inhibition of resultant cracking without causing significant set retardation to the treated composition.

DETAILED DESCRIPTION

It has been presently unexpectedly found that compounds of Formula I, as fully disclosed below, are capable of providing enhanced inhibition of drying shrinkage and resultant stress cracks normally encountered in structural concrete compositions.

Concrete compositions undergo a sequence of stages during its complete curing process. From the initial hydration until set, the mass undergoes certain dimensional changes including plastic shrinkage. The mass, however, may overcome and correct for the stresses which occur at this stage. However, subsequent to set, the mass undergoes further dimensional changes which are called dry changes including dry shrinkages. Although such dry shrinkage is small in magnitude, it gives rise to internal and external stresses which result in permanent cracks and deformations to the mass. Such cracks provide the means for seepage of water through the mass and for deterioration of the formed structure from forces encountered during freeze-thaw cycling of the entrapped water.

It has been unexpectedly found that shrinkage of structural concrete formations can be substantially inhibited by introducing an admixture composed of at least one diol having secondary and/or tertiary hydroxyl groups and represented by the formula

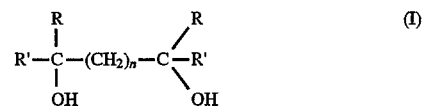

wherein each R independently represents hydrogen atom or a $C_1$–$C_2$ alkyl group; each R' independently represents a $C_1$–$C_2$ alkyl group; and n represents an integer of 1 or 2. Preferably, one or both R groups are selected from $C_1$–$C_2$ alkyl and n is 1.

Each $C_1$–$C_2$ alkyl group, i.e. methyl or ethyl, may be common to all the groups or may be different. Higher alkyl should not be used as such diols are not water soluble and, therefore, readily dispersible in the hydration water used in forming the cement structure. The preferred compound of Formula I is 2-methyl-2,4-pentanediol.

The present secondary/tertiary polyols represented by Formula I can be readily dispersed in aqueous media or formed into aqueous solutions. The polyols can be used as an admixture which is introduced into the concrete composition at the job site as part of the water of hydration or at the ready-mix batching plant. Alternately, the diol can be substantially uniformly mixed with a dry particulate hydraulic cement contemplated for use in forming a structural concrete composition. The mixture can be formed in known manners, such as by spraying the neat polyol or concentrated aqueous solution of the polyol onto a hydratable cement to provide a powdery solid product which can be used at a later time to form a structural concrete composition.

The present polyol should be used in at least about 0.8 percent, such as from about 0.8 to 5 percent, preferably from 1 to 3 percent, by weight based on the weight of hydraulic cement component of the concrete composition. Thus, under the process of the present invention, when the subject polyol is introduced into a hydraulic cement composition as part of the water component, it should be introduced in sufficient amount to provide at least 0.8 weight percent, such as 0.8 to 5, preferably from 1 to 5 weight percent and most preferably from 1 to 3 weight percent based on the hydraulic cement component of the structural concrete composition. When made part of a powder solid particulate hydraulic cement product, such product should be a substantially uniform (as uniform as practical using conventional processing) admixture having a weight ratio of from 95:5 to 99.2:0.8.

The presently described diols have been found to inhibit dry shrinkage to a high degree in a variety of structural concrete compositions. Such compositions are concretes formed from a mixture of a hydraulic cement; small aggregate such as sand; large aggregate such as gravel and stone; and small amounts of water. The hydraulic cements found suitable are ordinary portland cements (e.g. ASTM Type I), special portland cements (e.g. high early strength portland cements and moderate heat portland cement), blast furnace slag cement, portland fly ash cement as well as high alumina cement, blended cements (hydraulic cement containing 5-80% fillers or clinker substitutes which do not provide enhancement of 28 day compressive strength values) and the like.

The presently required diol provides a method of forming structural cement compositions such as structural concrete formations which have reduced dry shrinkage and resultant cracking. In addition, while providing the enhanced result it has been found that the presently required diols do not cause excessive set retardation as is attributable to polyols having primary or greater than two hydroxyl groups.

In the method of preparation of the structural cement composition of the invention, aggregates such as coarse aggregate (e.g. gravel), fine aggregate (e.g. sand), pumice and burned perlite may be used in known manners according to the specific application. Further, conventional water-reducing agents, air-entraining agents, expansive agents, shrinkage-reducing agents other than the present invention, and other known admixtures for mortar or concrete may be jointly used.

Examples of known additives for concrete include set accelerators, such as metal chlorides (e.g. calcium chloride); hardening retarders such as saccharides, starches, hydroxy carboxylic acids and glycerol; and corrosion inhibitors for reinforcing steel, such as sodium nitrite and calcium nitrite. The amount of such an optional additive are conventionally added to cement in from 0.01 to 5 wt % based on the weight of the cement.

The amount of water added to the structural concrete according to the invention should be at a low water to cement ratio provided it is sufficient to effect hydration. The water/cement ratio is usually about 0.25 to 0.6, and preferably from 0.25 to 0.5. Concrete compositions having this water/cement ratio are usually a semi-granular form which can be made more fluid by the addition of conventional water-reducing and/or superplasticizer agents for cements.

It has been found that the present admixture provides a further enhanced cement composition when used in combination with a water-reducing agent. The water-reducing agent can be added to the cement composition in ordinary manners, such as part of the hydraulic cement or as part of the addition of any other admixture which is added to the mixture of hydraulic cement, sand, gravel and water. The water-reducing agent may be introduced in from 0.05 to 5 weight percent based on the cement. The water reducing agent may be, for example, naphthalene sulfonate-formaldehyde condensates, lignin sulfonates, melamine sulfonate-formaldehyde condensates, polyacrylates and copolymers of maleic anhydride and alkenyl ether alcohols and the like.

It has been found that when the present secondary/tertiary polyol compound is made a part of the initial mixture of the structural concrete composition, the formed structure exhibits a decrease in shrinkage and corresponding stress cracks over untreated compositions. Thus, the present invention provides a method for inhibiting the formation of cracks and the like defects due to shrinkage. This method requires the formation of a substantially uniform mixture of cement, sand, gravel and water in conventional wt. ratios, such as 20–25:35–45:80–55:5–15 with at least one compound of Formula I. The cement to Formula I ratio being from 95:5 to 99.2:0.8 preferably 95:5 to 99:1. The mixture preferably contains a combination of Formula I compound and a water-reducing agent. The resultant mixture is cast into a shaped form and permitted to cure to result in a desired shaped article.

The drying shrinkage inhibiting agent of Formula I can be added either to a dry cement or to a mixture of concrete and other appropriate components forming the desired concrete composition. Because the present admixture polyols are low vapor pressure, high boiling liquid, they can be readily handled and stored without concern of evaporation and lack of potence at time of use. Thus, the present polyol shrinkage reducing agent can be either dry mixed with the cement powder, or spray applied to the cement powder with further mixing. Alternately, a composition of the shrinkage reducing agent in an aqueous solution, emulsion or dispersion may be first prepared and then mixed with cement and aggregate as part of the water of hydration, or a given amount of the shrinkage-reducing agent can be added to a mixture of cement, water, and aggregate while they are being stirred.

The concrete composition may be cured using any of the atmospheric, wet air, water, and/or heat-accelerated (steam, autoclave, etc.) curing techniques. If desired, two or more such techniques may be combined. The curing conditions may be the same as conventionally used.

The following examples are given for illustrative purposes only and are not meant to be a limitation on the claims appended hereto. All parts and percentages are by weight unless otherwise indicated. The examples given below utilize a micro-concrete mix formed from a mixture of aggregate sands having a particle size distribution which is proportional to and reflects that of standard concrete aggregate mix (sand and gravel).

EXAMPLE 1

A series of micro-concrete samples were formed according to the following procedure:

1800 parts of Type I portland cement was blended with a mixture of the following ASTM graded aggregates: 1069 parts of F-95 sand, 972 parts of C-109 sand, 972 parts of C-185 sand and 1847 parts of 15-S sand. The dry blending was conducted in a Hobart mixer for approximately five (5) minutes to attain a uniform blend having an aggregate to cement weight ratio of 2.7. To the blend was added 756 parts of deionized water (water to cement weight ratio of 0.42) into which an appropriate amount (See Table I below) of 2-methyl-2,4-pentanediol had been previously dissolved.

The blend was mixed in the Hobart mixer for approximately nine additional minutes to form a micro-concrete. (A hydraulic cement/aggregate mix which uses smaller proportioned aggregates to simulate concrete.)

Each of the formed micro-concrete compositions were poured into four to five prism molds with a square (1 inch by 1 inch) cross-section. The inner surface of each mold was pretreated to provide nonstick surfaces. Each prism was evenly filled using a vibrating table and by screeding off (leveling off with a knife blade) any excess mix from the surface. Each series of molds was transferred to a fog chamber which was maintained at room temperature and 100% relative humidity to permit the sample to be initially moist cured for twenty-four hours. The samples were then removed from the fog chamber, demolded and placed in an environmental chamber maintained at 50% relative humidity and 22° C. to proceed with dry curing. The length of each prism was periodically measured using a length comparator according to ASTM C-490-89 test procedure.

The above was repeated using varying amounts of the secondary/tertiary polyol, 2-methyl-2,4-pentanediol. Each series was run for twenty-eight days. The results shown in Table I below show that a substantial reduction in shrinkage ($\Delta L/L$) was attained when the subject polyol was present in dosages of the present invention (Samples 4, 5 and 6).

TABLE I

| Sample # | Dosage (wt. %) | $\Delta L/L \times 10^6$ (in/in) | % Reduction in Shrinkage |
|---|---|---|---|
| 1 | 0 | 669 | 0 |
| 2 | 0.1 | 732 | −9 |
| 3 | 0.5 | 648 | 4 |
| 4 | 1.0 | 444 | 34 |
| 5 | 2.0 | 340 | 49 |
| 6 | 4.0 | 210 | 69 |

EXAMPLE II

A second series of experiments were conducted to compare, on a back-to-back basis, the effectiveness of a subject secondary/tertiary polyol (exemplified by 2-methyl-2,4-pentanediol) to that of various primary diols. Each of the series of samples were formed in the same manner as described above in Example I. In addition, a second series was formed in the same manner except that the samples were permitted to remain under moist cure conditions for seven (7) days prior to demolding and dry curing.

The resultant data given in Table II below shows that the secondary/tertiary diol of the present invention provides consistently enhanced shrinkage reduction over various primary/terminal diols of similar molecular weights.

TABLE II

| Alaknediol | Dose (wt. %) | % Redn in Shrinkage (Dry Cure) | % Redn in Shrinkage (Moist Cure) |
|---|---|---|---|
| 2-methyl-2,4-pentanediol | 1 | 32 | 33 |
|  | 2 | 45 | 46 |
| 2-methyl-1,3-propanediol | 1 | 16 | 16 |
|  | 2 | 23 | 36 |
| 1,5 Pentanediol | 2 | 18 | 46 |
| 1,4 Butanediol | 2 | −8.0 | 15 |

EXAMPLE III

A series of samples were prepared of a concrete having a cement factor of 611 pounds per cubic yard. The concrete was formed from 611 parts portland cement, 1270 parts sand, 1750 parts aggregate and water at a water to cement ratio of 0.51. The concrete was partitioned into samples to which 2-methyl-2,4-pentanediol (MPD) was added as part of the mix in amounts as shown in Table III below. In addition, a concrete of the same formulation as above was prepared except that the MPD was added in combination with naphthalene sulfonate-formaldehyde condensate water reducing agent and the water to cement ratio was reduced to 0.41 to obtain the same slump as developed by the above samples. The results are shown in Table III below.

Cast samples were cured at 100 percent relative humidity for one or seven days. Shrinkage was measured on the samples according to ASTM-C-490-89 test procedures.

TABLE III

| Additive | Dosage | W/C | Slump | $\Delta L/L \times 10^6$ 1 Day | $\Delta L/L \times 10^6$ 7 Days | % Reduction in Shrinkage 1 Day | % Reduction in Shrinkage 7 Days |
|---|---|---|---|---|---|---|---|
| None | 0 | 0.51 | 7.5 | 855 | 815 | — | — |
| MPD* | 2% | 0.51 | 9 | 640 | 590 | 25 | 28 |
| MPD* | 1% | 0.51 | 9 | 780 | 765 | 9 | 6 |
| MPD* + NSFC** | 2/0.5 | 0.41 | 9 | 550 | 510 | 36 | 37 |

*2-methyl-2,4-pentanediol
**Naphthalene sulfonate-formaldehyde condensate

EXAMPLE IV

Micro concrete samples were formed according to the procedure described in Example I above. The sand to cement ratio was 2.7 and the water to cement ratio was 0.42. 2-methyl-2,4-pentanediol was added as described above in Example I. Each mix was cast into a stainless steel O ring mold with a 12" outer ring and an 8" inner ring formed from 0.5" thick Schedule 80 carbon steel. The samples were cured for six hours at 100% relative humidity and then demolded from the outer ring while retaining the inner ring of the mold in place. The samples were dried at 50% relative humidity until cracking occurred. The time (days) for the restrained sample to crack was observed and reported in Table IV below.

TABLE IV

| | Restrained Shrinkage | |
|---|---|---|
| Additive | Dosage | Restrained Shrinkage Days to Crack |
| — | — | 10 |
| MPD | 0.1 | 11 |
| MPD | 0.5 | 11 |
| MPD | 1 | 20 |
| MPD | 2 | 28 |
| MPD | 4 | >28 |

EXAMPLE V

A series of micro concrete samples were formed according to the procedure of Example 1 above, to observe the shrinkage reduction and set times for samples having equal molar amounts of various polyols which have primary/terminal diols or triol compounds and compare them to 2-methyl-2,4 pentanediol, a secondary diol according to the present invention. The results of Table V below show that the diol of the present invention provides consistently enhanced shrinkage reduction and does not cause significant set retardation (as measured by standard penetrometer test) while the other polyols caused much higher degree of shrinkage (lower percent reduction in shrinkage) or inhibition of set.

TABLE V

| Compound | Dosage | % Reduction in Shrink |
|---|---|---|
| 2-methyl-2,4-pentanediol | 1.5 | 30 |
| 1,4-butanediol | 1.5 | 13 |
| 1,5-pentanediol | 1.5 | 19 |
| glycerol | 1.5 | no set |
| trimethyol propane | 1.5 | 0 |

From the data of Table V above, it is seen that 2-methyl-2,4 pentanediol, a secondary diol of the present invention provides a substantial increase in shrinkage reduction over the reduction attainable from the various primary diols and triols tested for comparative purposes.

What is claimed:

1. An improved particulate cement composition comprising a mixture of a hydraulic cement powder selected from portland cement, blended cement or alumina cement and having distributed therein from 0.8 to 5 weight percent based on the cement of at least one polyol compound represented by formula:

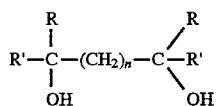

wherein each R is independently selected from hydrogen atom or a $C_1$–$C_2$ alkyl; each R' independently selected from a $C_1$–$C_2$ alkyl and n is an integer of 1 or 2.

2. The cement composition of claim 1 wherein the polyol compound is present in an amount of from 1 to 3 weight percent based on the hydraulic cement.

3. The cement composition of claim 2 wherein the compound of Formula I is 2-methyl-2,4-pentanediol.

4. The cement composition of claim 2 which further contains from 0.05 to 5 weight percent based on the cement of a water reducing agent selected from the group consisting of naphthalene sulfonate-formaldehyde condensates, lignin sulfonates, melamine sulfonate-formaldehyde condensates, polyacrylates and copolymers of maleic anhydride and alkenyl ether alcohols.

5. A structural concrete composition capable of inhibiting drying shrinkage comprising the hydraulic cement composition of claim 1, fine particulate, course aggregate and water, wherein the composition has a water to cement ratio of from about 0.25 to 0.6.

6. A structural concrete composition capable of inhibiting drying shrinkage comprising the hydraulic cement composition of claim 2, fine particulate, course aggregate and water, wherein the composition has a water to cement ratio of from about 0.25 to 0.6.

7. A structural concrete composition capable of inhibiting drying shrinkage comprising the hydraulic cement composition of claim 3, fine particulate, course aggregate and water, wherein the composition has a water to cement ratio of from about 0.25 to 0.6.

8. A structural concrete composition capable of inhibiting drying shrinkage comprising the hydraulic cement composition of claim 4, fine particulate, course aggregate and water, wherein the composition has a water to cement ratio of from about 0.25 to 0.6.

9. A method of forming a concrete structure capable of inhibiting drying shrinkage and cracking resulting therefrom comprising a) forming a mixture of from 20 to 25 parts by weight of a hydraulic cement, from 35 to 45 parts by weight of fine aggregate, from 55 to 80 parts by weight of coarse aggregate, from 5 to 15 parts by weight of water, wherein the mixture has a water to cement weight ratio from about 0.25 to 0.6, and from about 0.8 to 5 weight percent based on the weight of the hydraulic cement of at least one polyol compound of the formula:

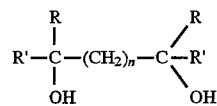

wherein each R is independently selected from hydrogen atom or a $C_1$–$C_2$ alkyl; each R' is independently selected from $C_1$–$C_2$ alkyls and n is an integer of 1 or 2;

b) casting the mixture into a mold; and c) curing the mixture to provide a shaped structure, which structure exhibits reduced drying shrinkage.

10. The method of claim 9 wherein the mixture further contains cement admixtures selected from the group consisting of air-entraining agents, expansive agents, set accelerators, set retarders, corrosion inhibitors or additional shrinkage reducing agents and mixtures thereof.

11. The method of claim 9 wherein the polyol is 2-methyl-2,4-pentanediol.

12. The method of claim 10 wherein the polyol is 2-methyl-2,4-pentanediol.

13. The method of claim 9 wherein the polyol compound is present in an amount of from 1 to 3 weight percent based on the hydraulic cement.

14. The cement composition of claim 1 wherein the mixture further contains fine aggregate and coarse aggregate.

15. The cement composition of claim 2 wherein the mixture further contains fine aggregate and coarse aggregate.

16. The cement composition of claim 3 wherein the mixture further contains fine aggregate and coarse aggregate.

17. The cement composition of claim 14 wherein the mixture has from 20–25 weight % hydraulic cement; 35–45 weight % fine aggregate and from 55 to 80 weight % coarse aggregate.

18. The cement composition of claim 15 wherein the mixture has from 20–25 weight % hydraulic cement; 35–45 weight % fine aggregate and from 55 to 80 weight % coarse aggregate.

19. The cement composition of claim 16 wherein the mixture has from 20–25 weight % hydraulic cement; 35–45 weight % fine aggregate and from 55 to 80 weight % coarse aggregate.

* * * * *